(12) United States Patent
Kubota

(10) Patent No.: US 10,652,408 B2
(45) Date of Patent: May 12, 2020

(54) READING APPARATUS, CONTROL METHOD FOR READING APPARATUS, CONTROL APPARATUS, AND PROGRAM

(71) Applicant: SEIKO EPSON CORPORATION, Tokyo (JP)

(72) Inventor: Hiroaki Kubota, Matsumoto (JP)

(73) Assignee: SEIKO EPSON CORPORATION, Tokyo (KE)

( * ) Notice: Subject to any disclaimer, the term of this patent is extended or adjusted under 35 U.S.C. 154(b) by 0 days.

(21) Appl. No.: 15/902,715

(22) Filed: Feb. 22, 2018

(65) Prior Publication Data
US 2018/0249024 A1    Aug. 30, 2018

(30) Foreign Application Priority Data
Feb. 24, 2017   (JP) .................. 2017-033036

(51) Int. Cl.
*H04N 1/00*      (2006.01)
*G06F 3/12*       (2006.01)

(52) U.S. Cl.
CPC ....... *H04N 1/00236* (2013.01); *G06F 3/1256* (2013.01); *H04N 1/0044* (2013.01); *H04N 1/00222* (2013.01); *H04N 2201/0081* (2013.01); *H04N 2201/0087* (2013.01); *H04N 2201/0089* (2013.01)

(58) Field of Classification Search
CPC ........... H04N 1/00222; H04N 1/00236; H04N 1/0044; H04N 2201/0081; H04N 2201/0087; H04N 2201/0089; G06F 3/1241; G06F 3/1244; G06F 3/1256; G06F 3/1262

USPC ......... 358/1.11–1.18, 1.1, 1.9, 2.1, 442, 537, 358/538, 3.23

See application file for complete search history.

(56) References Cited

U.S. PATENT DOCUMENTS

| | | | | |
|---|---|---|---|---|
| 5,659,669 | A | * | 8/1997 | Narukawa ............. G06F 3/1295 358/1.16 |
| 2002/0184249 | A1 | * | 12/2002 | Shibata ............... H04N 1/32101 |
| 2005/0179926 | A1 | * | 8/2005 | Nishikawa ............ G06F 3/1205 358/1.13 |
| 2008/0002899 | A1 | * | 1/2008 | Breswick ............... H04N 19/60 382/244 |

(Continued)

FOREIGN PATENT DOCUMENTS

| | | | |
|---|---|---|---|
| JP | 2010-245610 A | | 10/2010 |
| JP | 2010245610 A | * | 10/2010 |

*Primary Examiner* — Chad Dickerson
(74) *Attorney, Agent, or Firm* — Foley & Lardner LLP

(57) ABSTRACT

A reading apparatus includes a storage configured to store data in the storage, a reader configured to optically read a medium, and a processor configured to, in response to the reading of the medium by the reader, acquire a set of read data based on the result of the reading, generate an image file based on the acquired set of read data, and allow the storage to store in itself the generated image file. Further, the processor includes the function of, when generating the image file, generating a plurality of image files resulting from a division that allows the file size of each of the plurality of image files to be smaller than a size upper limit, and of allowing the storage to store in itself the generated plurality of image files in a state in which the plurality of image files are associated with one another.

16 Claims, 7 Drawing Sheets

(56) References Cited

U.S. PATENT DOCUMENTS

| | | | |
|---|---|---|---|
| 2010/0002270 A1* | 1/2010 | Suzuki | H04N 1/32358 358/444 |
| 2010/0037134 A1* | 2/2010 | Nozaki | H04N 1/00236 715/273 |
| 2011/0194127 A1* | 8/2011 | Nagakoshi | H04N 1/0044 358/1.9 |

* cited by examiner

READING APPARATUS, CONTROL METHOD FOR READING APPARATUS, CONTROL APPARATUS, AND PROGRAM

CROSS REFERENCE TO RELATED APPLICATIONS

This application claims priority to Japanese Application No. 2017-033036 filed Feb. 24, 2017, the contents of which are incorporated by reference herein in their entirety.

BACKGROUND

1. Technical Field

The present invention relates to a reading apparatus, a control method for a reading apparatus, a control apparatus, and a program.

2. Related Art

Heretofore, reading apparatuses (image reading apparatuses) for reading a medium (a draft) through a reader (a reading means), generating an image file on the basis of the result of the reading, and storing the image file have been well known (for example, see JP-A-2010-245610).

For such the above-mentioned reading apparatus configured to generate an image file on the basis of the result of reading, an upper limit is sometimes set for the file size of the generated image file. In such a case, the reading apparatus is required to achieve processing for successively dealing with the upper limit that is set for the file size.

SUMMARY

An advantage of some aspects of the invention is that, for a reading apparatus configured to read a medium through a reader and generate an image file on the basis of the result of the reading, technology that enables the reading apparatus to achieve processing for successfully dealing with an upper limit that is set for the file size of the generated image file is provided.

According to a first aspect of the invention, a reading apparatus includes a storage configured to store data in the storage, a reader configured to optically read a medium, and a processor configured to, in response to the reading of the medium by the reader, acquire a set of read data based on the result of the reading, generate an image file on the basis of the acquired set of read data, and allow the storage to store in itself the generated image file. Further, the processor includes the function of, when generating the image file, generating a plurality of image files resulting from a division that allows the file size of each of the plurality of image files to be smaller than a size upper limit, and of allowing the storage to store in itself the generated plurality of image files in a state in which the plurality of image files are associated with one another.

According to this configuration, for the result of the reading of the medium by the reader, the reading apparatus is capable of, without causing any loss, storing an image file which is based on the result of the reading and whose file size is smaller than the size upper limit into the storage. That is, the reading apparatus is capable of achieving processing for successively dealing with an upper limit that is set for the file size of a generated image file.

In the first aspect of the invention, the processor may include the function of, based on the plurality of image files that are associated with one another, combining images recorded in the respective plurality of image files, and outputting the combined images.

According to this configuration, in the case where the plurality of image files have been generated, the reading apparatus is capable of outputting an image having sameness with an image having been read by the reader, on the basis of the plurality of image files.

In the first aspect of the invention, the processor may include the function of, based on the plurality of image files that are associated with one another, combining images recorded in the respective plurality of image files, and print-outputting the combined images.

According to this configuration, in the case where the plurality of image files have been generated, the reading apparatus is capable of print-outputting an image having sameness with an image having been read by the reader, on the basis of the plurality of image files.

In the first aspect of the invention, the processor may include the function of, based on the plurality of image files that are associated with one another, combining images recorded in the respective plurality of image files, and display-outputting the combined images.

According to this configuration, in the case where the plurality of image files have been generated, the reading apparatus is capable of display-outputting an image having sameness with an image having been read by the reader, on the basis of the plurality of image files.

In the first aspect of the invention, based on the reading of the medium by the reader, the processor may generate a set of thumbnail image data in which a thumbnail image corresponding to an image recorded on the medium is recorded, and may allow the storage to store in itself the generated set of thumbnail image data in a state in which the set of thumbnail image data is associated with the generated image file.

According to this configuration, the processor is capable of performing processing utilizing the set of thumbnail image data, on the basis of the set of thumbnail image data, which the processor has allowed the storage to store in itself.

In the first aspect of the invention, when generating the divided plurality of image files, the processor may record at least one image representing at least one boundary of the plurality of image files on the thumbnail image recorded in the set of thumbnail image data.

According to this configuration, when display-outputting the thumbnail image on the basis of the set of thumbnail image data, the reading apparatus is capable of clearly indicating the boundary between every two adjacent image files.

In the first aspect of the invention, the at least one image representing the at least one boundary of the plurality of image files may be a dashed line.

According to this configuration, the use of the dashed line that is widely used for indicating a boundary enables the at least one boundary of the plurality of image files to be clearly indicated in an appropriate manner.

In the first aspect of the invention, the processor may allow the plurality of image files to be associated with one another by allowing the file names of the respective plurality of image files to have associations with one another.

According to this configuration, the processor is capable of, based on the associations among the file names, managing the plurality of image files, which have been divided and generated on the basis of the result of the reading by the reader, in a state in which the plurality of image files are associated with one another.

In the first aspect of the invention, the processor may allow the file names of the respective plurality of image files to have associations with one another by allowing each of the file names of the respective plurality of image files to include information common to the plurality of image files.

According to this configuration, the processor is capable of correctly allowing the file names to have associations with one another.

In the first aspect of the invention, the processor may allow the plurality of image files to be associated with one another by successively storing the plurality of image files into a storage region of the storage.

According to this configuration, the processor is capable of, through the utilization of the successive storage of the plurality of image files into the storage region of the storage, managing the plurality of image files, which have been divided and generated on the basis of the result of the reading by the reader, in a state in which the plurality of image files are associated with one another.

According to a second aspect of the invention, a control method for a reading apparatus including a storage configured to store data in the storage, and a reader configured to optically read a medium includes a process of, in response to the reading of the medium by the reader, acquiring a set of read data based on the result of the reading; a process of, based on the acquired set of read data, generating a plurality of image files in such a way as to allow the file size of each of the plurality of image files to be smaller than a size upper limit; and a process of allowing the storage to store in itself the generated plurality of image files in a state in which the plurality of image files are associated with one another.

According to this configuration, for the result of the reading of the medium by the reader, the reading apparatus is capable of, without causing any loss, storing an image file which is based on the result of the reading and whose file size is smaller than the size upper limit into the storage. That is, the reading apparatus is capable of achieving processing for successively dealing with an upper limit that is set for the file size of a generated image file.

According to a third aspect of the invention, a control apparatus is configured to, based on the result of reading by a reading apparatus that optically reads a medium, acquire a set of drawing data based on a plurality of image files generated by a division that allows the file size of each of the plurality of image files to be smaller than a size upper limit; combine images recorded in the respective plurality of image files on the basis of the acquired set of drawing data; and display the combined images on a display.

According to this configuration, in the case where the plurality of image files have been generated by the reading apparatus, the control apparatus is capable of displaying an image having sameness with an image having been read by the reading apparatus.

In the third aspect of the invention, the set of drawing data may include information in relation to a thumbnail image of an image having been read by the reading apparatus, and the thumbnail image may be displayed on the display on the basis of the set of drawing data.

According to this configuration, a user is able to refer to the thumbnail image of an image based on the result of the reading by the reading apparatus.

In the third aspect of the invention, when the thumbnail image is displayed on the basis of the set of drawing data, at least one image representing at least one boundary of the plurality of image files may be displayed.

According to this configuration, the control apparatus is capable of clearly indicating the boundary between every two adjacent image files.

In the third aspect of the invention, the at least one image representing the at least one boundary of the plurality of image files may be a dashed line.

According to this configuration, the use of the dashed line that is widely used for indicating a boundary enables the at least one boundary of the plurality of image files to be clearly indicated in an appropriate manner.

According to a fourth aspect of the invention, a program allows a reading apparatus including a reader to execute processing including a process of, in response to reading of a medium by the reader, acquiring a set of read data based on the result of the reading, and a process of, based on the acquired set of read data, generating a plurality of image files resulting from a division that allows the file size of each of the plurality of image files to be smaller than a size upper limit.

This configuration enables the reading apparatus to, for the result of the reading of the medium by the reader, store an image file which is based on the result of the reading and whose file size is smaller than the size upper limit into the storage without causing any loss. That is, this configuration enables the reading apparatus to achieve processing for successively dealing with an upper limit that is set for the file size of a generated image file.

According to a fifth aspect of the invention, a program allows a control apparatus including a display to execute processing including a process of, based on the result of reading by a reading apparatus that optically reads a medium, acquiring a set of drawing data based on a plurality of image files generated by a division that allows the file size of each of the plurality of image files to be smaller than a size upper limit, and a process of, based on the acquired set of drawing data, combining images recorded in the respective plurality of image files, and displaying the combined images on the display.

This configuration enables the control apparatus to, in the case where the reading apparatus has generated the plurality of image files on the basis of the result of the reading, display an image having sameness with an image having been read by the reading apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the present invention will be described with reference to the drawings.

Figure 1:
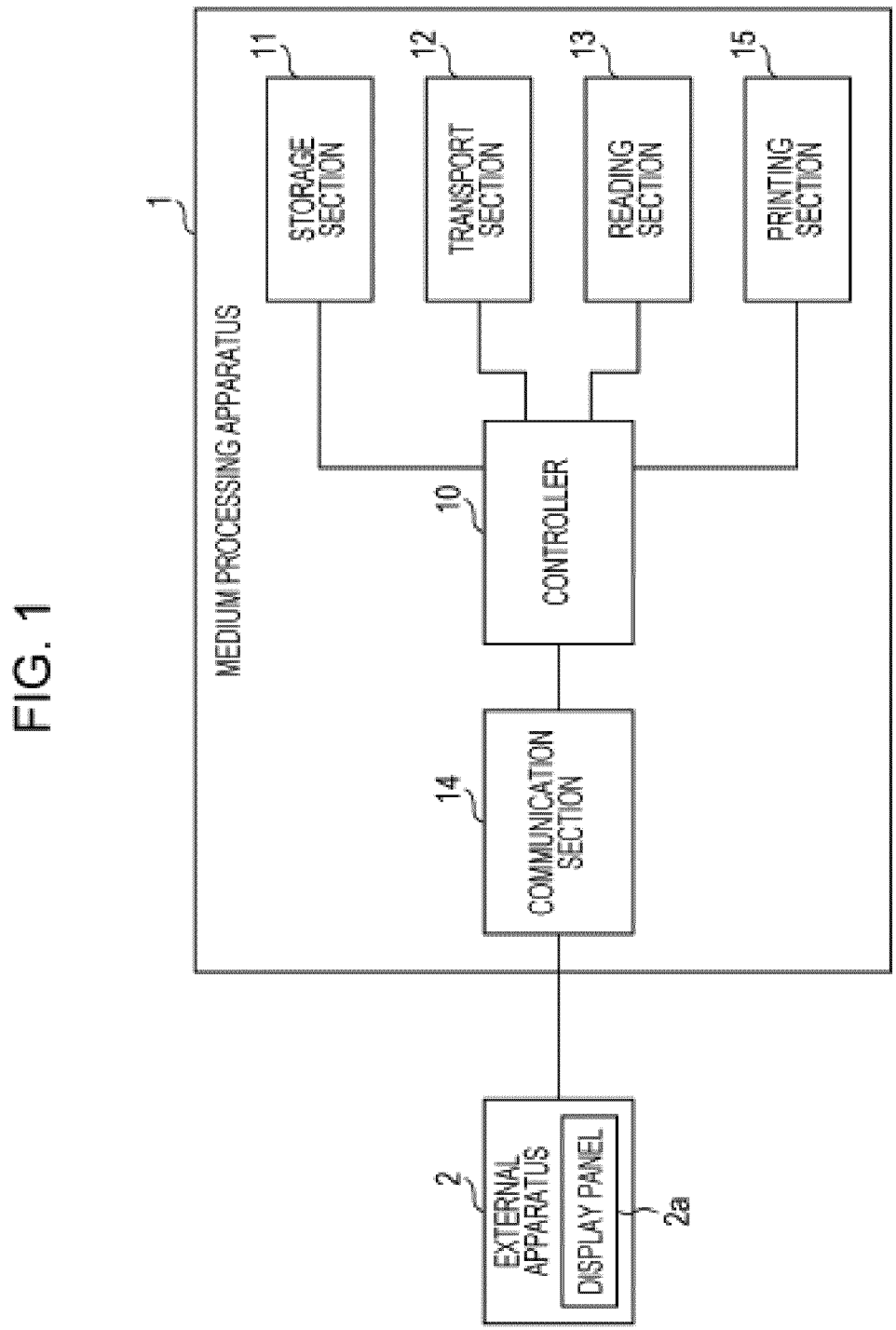
FIG. 1 is a block diagram illustrating a functional configuration of a medium processing apparatus.

FIG. 1 is a block diagram illustrating a functional configuration of a medium processing apparatus 1, as a medium processing apparatus (a reading apparatus) according to the present embodiment.

The medium processing apparatus 1 is an apparatus including the function of printing images on a medium having been set in the relevant apparatus, and the function of optically reading the medium. In the medium processing apparatus 1 according to the present embodiment, a large-size medium can be set as a printing target medium and a reading target medium. In the medium processing apparatus 1, as an example of the medium, paper having "A0" size can be set in the case of single sheet paper, and as another example of the medium, paper whose width is larger than "900 millimeters" can be set in the case of roll paper. Note that the medium is not limited to paper, as a paper medium, but means a medium that can be set in the medium processing apparatus 1 and that can be handled as a target of printing performed by the medium processing apparatus 1 and can be handled as a target of reading performed by the medium processing apparatus 1. Examples of such a medium include, but are not limited to, film and fabric.

Hereinafter, a medium handled as a printing target of the medium processing apparatus 1 will be referred to as "a printing medium", and a medium handled as a reading target of the medium processing apparatus 1 will be referred to as "a reading medium".

As illustrated in FIG. 1, the medium processing apparatus 1 includes a controller 10, a storage section 11, a transport section 12, a reading section 13, a communication section 14, and a printing section 15.

The controller 10 includes a CPU, ROM, RAM, ASICs, signal processing circuits, and the like, and controls individual portions of the medium processing apparatus 1. The controller 10 performs processes using hardware and software in such a way as to allow, for example, the CPU to read programs stored in the ROM into the RAM to execute processes; allow, for example, the ASICs to perform functions implemented therein to execute processes; allow, for example, the signal processing circuits to perform signal processes to execute processes; and the like.

The storage section 11 includes nonvolatile memory, such as EEPROM or the like, and stores data therein.

The transport section 12 includes a transport mechanism for transporting a reading medium having been set in the medium processing apparatus 1, and transports the reading medium in a transport direction under the control of the controller 10. Further, the transport section 12 includes a transport mechanism for transporting a printing medium having been set in the medium processing apparatus 1, and transports the printing medium in a transport direction under the control of the controller 10.

The reading section 13 includes a contact image sensor (CIS) module. The CIS module includes a line sensor in which a CMOS image sensor is arranged in a line shape along a direction orthogonal to the transport direction in which the transport section 12 transports the reading medium (the direction orthogonal to the transport direction being referred to as "a line direction" hereinafter). Note that, in the present embodiment, the reading section 13 includes one CIS module including a line sensor whose length is longer than the length of the width of a reading medium having a maximum width among reading media settable in the medium processing apparatus 1. In this regard, however, a configuration in which a plurality of CIS modules are arranged in a zigzag formation which allows the plurality of CIS modules arranged in the zigzag formation to read the reading medium may be employed. Further, in the present embodiment, a reading method for reading the reading medium in the medium processing apparatus 1 is a CIS contact sensor method using a CMOS image sensor. In this regard, however, the reading method is not limited to the CIS contact sensor method.

For example, the reading method may be a CCD optical reduction method using a CCD image sensor.

Under the control of the controller 10, the reading section 13 optically reads the reading medium transported by the transport section 12 using the line sensor of the CIS module; performs necessary signal processes, such as an A/D conversion process and the like; and outputs data based on the result of the reading to the controller 10. The controller 10 generates an image file on the basis of the data input from the reading section 13, and stores the image file into the storage section 11. Processing for reading the reading medium by the reading section 13 and processing for generating the image file by the controller 10 will be described in detail later.

The communication section 14 communicates with an external apparatus 2 in compliance with a predetermined communication protocol under the control of the controller 10.

The printing section 15 includes a printing mechanism for performing printing of images on the printing medium, and performs printing on the printing medium under the control of the controller 10. The printing mechanism includes an ink jet head for discharging inks and thereby forming dots on the printing medium having been set in the medium processing apparatus 1; a carriage for allowing the ink jet head to operate in a scanning direction; a cutter unit for transporting the printing medium; a heater for drying the printing medium on which the inks are adhered; and the like.

The external apparatus 2 (the control apparatus) is an apparatus communicable with the medium processing apparatus 1. The external apparatus 2 may be an apparatus that is directly connected to the medium processing apparatus 1 using a USB cable or the like; may be an apparatus connected to the medium processing apparatus 1 via a local area network; or may be an apparatus connected to the medium processing apparatus 1 via a global network including the Internet.

As illustrated in FIG. 1, the external apparatus 2 includes a display panel 2a (the display). The display panel 2a is a panel that displays information, such as a liquid crystal panel or an organic EL panel.

By the way, as described above, the controller 10 generates the image file on the basis of the data input from the reading section 13, and stores the image file into the storage section 11. Here, in the medium processing apparatus 1 according to the present embodiment, for files, such as the image file and the like, an upper limit for a file size (hereinafter referred to as "a size upper limit") is prescribed, and a file having a file size exceeding the size upper limit is forbidden to be stored into the storage section 11. As described above, the medium processing apparatus 1 according to the present embodiment is capable of handling a large-size reading medium as a reading target, and in the case where such a large-size reading medium is handled as the reading target, when one image file is generated on the basis of the result of reading, there may occur a case where the file size of the generated image file exceeds the size upper limit.

In view of the above case, when reading a reading medium, the medium processing apparatus 1 performs processing described below.

Figure 2:
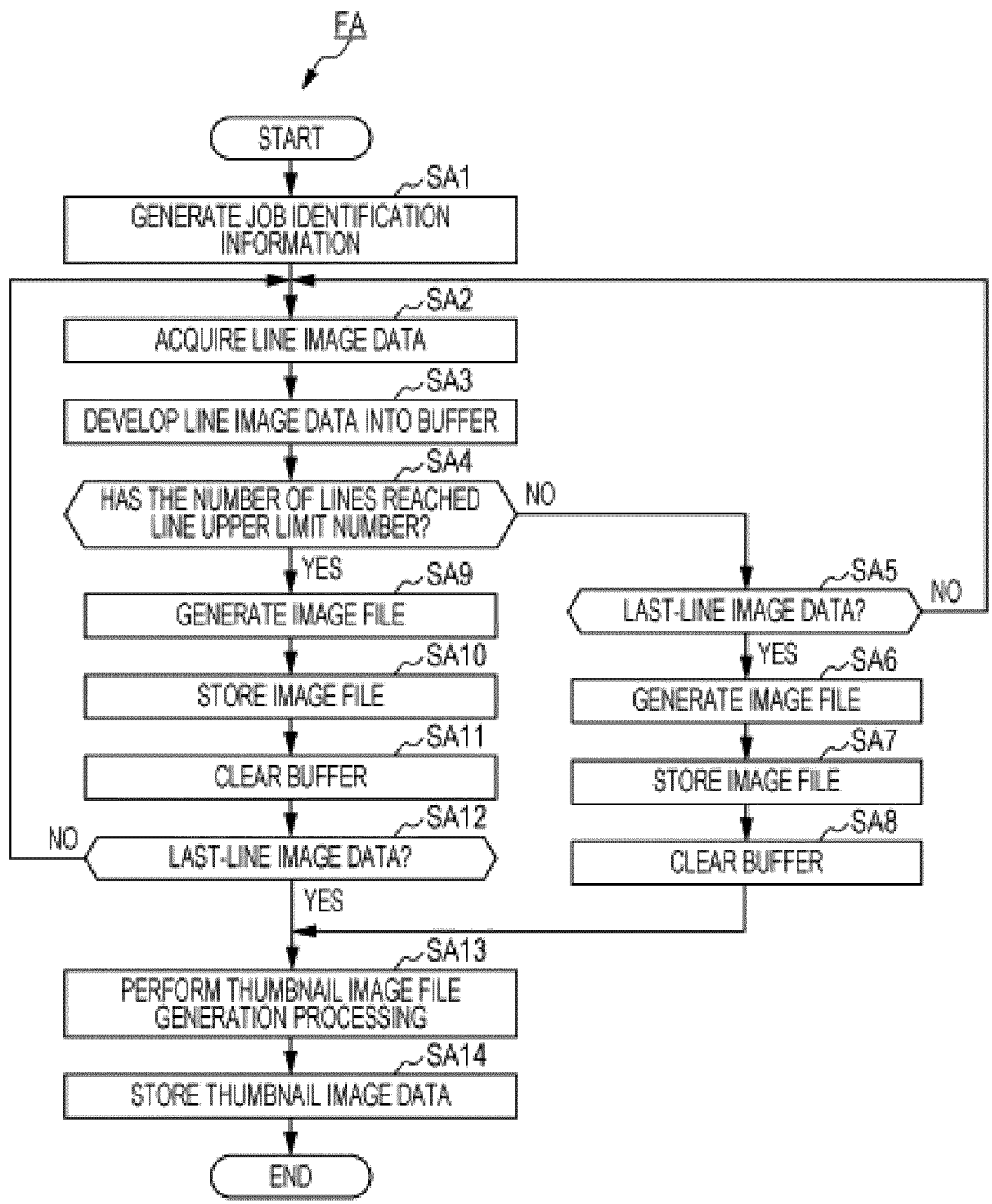
FIG. 2 is a flowchart illustrating the operation of the medium processing apparatus.

A flowchart FA in FIG. 2 is a flowchart illustrating the operation of the medium processing apparatus 1.

The medium processing apparatus 1 performs processes of the flowchart FA by exerting the functions of the installed program. That is, the program allows the medium processing apparatus 1 to perform the processes of the flowchart FA.

At the time of start of the flowchart FA in FIG. 2, the medium processing apparatus 1 is in a state in which a reading medium is set therein. Here, in the present embodiment, a user is able to select one reading resolution level from among a plurality of reading resolution levels. Thus, at the time of start of the flowchart FA in FIG. 2, the medium processing apparatus 1 is in a state in which a reading resolution level has been selected by the user. Moreover, at the time of start of the flowchart FA in FIG. 2, the medium processing apparatus 1 is in a state in which a line-direction range handled as a reading target (hereinafter referred to as "a reading range") has been designated by the user.

In response to starting of the reading of the reading medium, the transport section 12 transports the reading medium having been set in the medium processing apparatus 1 in the transport direction, and the reading section 13 executes the reading of the reading medium transported by the transport section 12. The reading section 13 outputs a set of image data for each line (hereinafter referred to as "a set of line image data") to the controller 10 on the basis of the result of the reading by the CIS module. The set of line image data is data in relation to a set of dots extending and arranged in one row in a direction corresponding to the line direction. For each of the dots constituting the set of line image data, color components of individual colors of the RGB system are retained as grayscale values in a predetermined gray scale. The size of the set of line image data is determined on the basis of the resolution level having been selected by the user and the reading range having been designated by the user. The set of line image data corresponds to "the set of read data".

The controller 10 manages reading operations with respect to one reading medium as one job.

As shown in the flowchart FA in FIG. 2, in response to starting of the reading of the reading medium, the controller 10 manages the reading of the reading medium as a job, and generates a piece of job identification information (step SA1). The controller 10 manages the value of the piece of job identification information as a unique value for each job.

In response to the reading of the reading medium, the controller 10 acquires a set the line image data, which is input from the reading section 13 (step SA2).

Next, the controller 10 develops the set of line image data having been acquired in step SA2 into an image buffer BF (step SA3). The image buffer BF is a buffer formed in a storage region of a write/read medium functioning as work memory, such as the RAM or the like.

Figure 3:
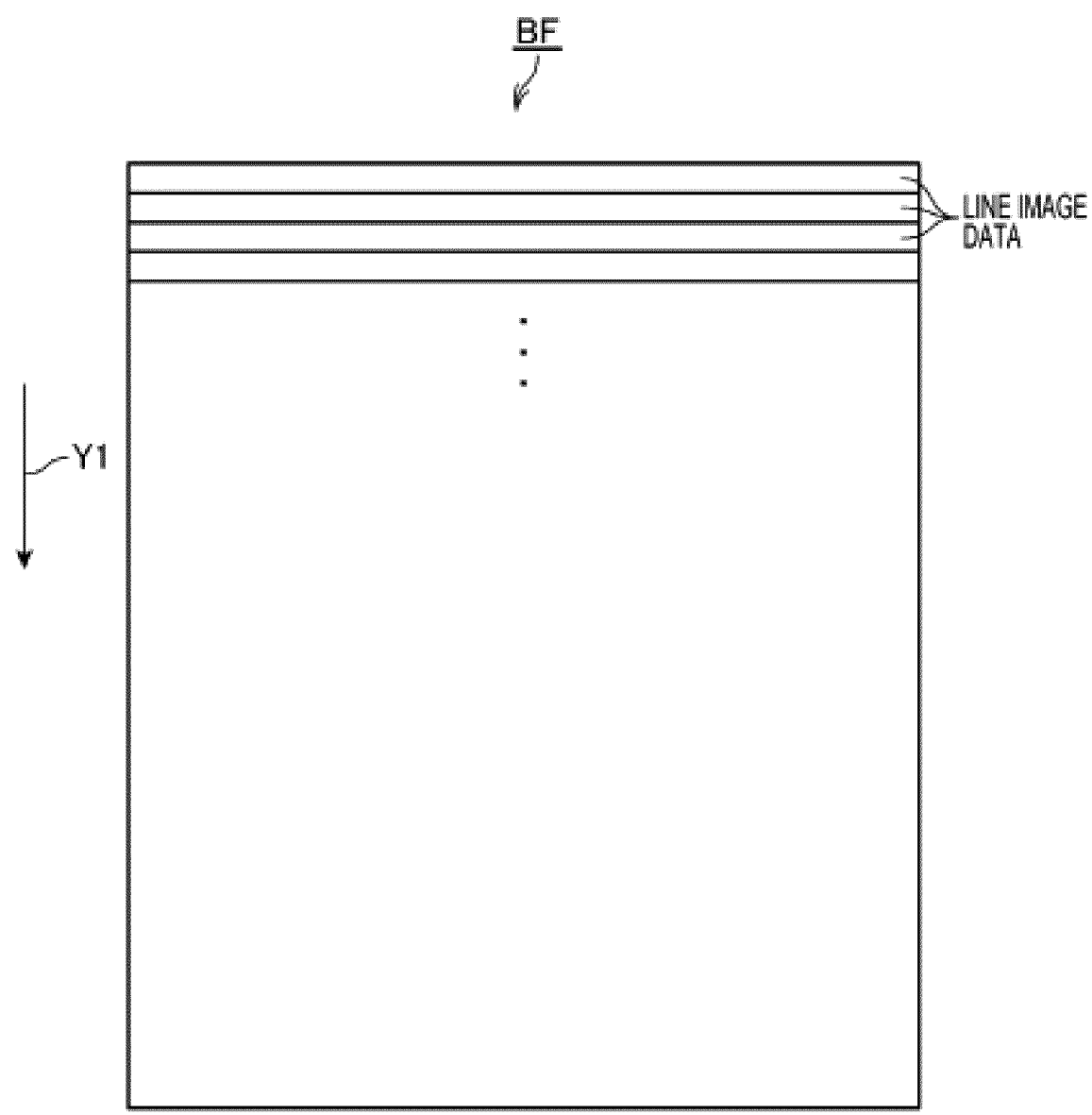
FIG. 3 is a diagram illustrating an image buffer.

FIG. 3 is a diagram schematically illustrating the image buffer BF in a form suitable for description.

As illustrated in FIG. 3, in the image buffer BF, the set of line image data can be sequentially developed in a direction Y1.

In step SA3, the controller 10 develops the set of line image data having been acquired in step SA2 into a region next to the region for an immediately preceding set of line image data having been developed in the image buffer BF.

Next, the controller 10 determines whether or not the number of sets of line image data having been developed into the image buffer BF (the relevant number being referred to as "a total line number" hereinafter) has reached a line upper limit number (step SA4).

The value of the line upper limit number is set to a value that, in the case where an image file is generated on the basis of individual sets of line image data that have been developed into the image buffer BF, allows the file size of the generated image file to be close to and not beyond the size upper limit. Accordingly, in the case where an image file is generated on the basis of sets of line image data which have been developed in the image buffer BF and whose total line number is equal to the line upper limit number, the file size of the generated image file is close to and not beyond the size upper limit.

As described above, the size of the set of line image data changes along with the change of the combination of the reading resolution level and the reading range. Thus, the value of the line upper limit number changes along with the change of the combination of the reading resolution level and the reading range. Further, the line upper limit number is appropriately prescribed in advance for each of combinations of the reading resolution level and the reading range. In step SA4, the controller 10 compares a total line number of sets of line image data having been developed into the image buffer BF with a line upper limit number corresponding to a combination of a reading resolution level and a reading range, and thereby determines whether or not the total line number has reached the line upper limit number.

In the case where the result of the determination in step SA4 is that the total line number does not reach the line upper limit number (step SA4: NO), the controller 10 determines whether or not the set of line image data having been acquired in step SA2 is a last set of line image data (hereinafter referred to as "a last-line image data set") among sets of line image data that the reading section 13 has output in response to its reading of the reading medium (step SA5). The controller 10 manages, for each job, a status of the reading of the reading medium by the reading section 13, and performs the process in step SA5 on the basis of the result of the management.

In the case where the set of line image data having been acquired in step SA2 is not the last-line image data set (step SA5: NO), the controller 10 allows the process procedure to move to step SA2.

In the case where the set of line image data having been acquired in step SA2 is the last-line image data set (step SA5: YES), the controller 10 generates an image file on the basis of all sets of line image data that are developed in the image buffer BF at the present time (step SA6). In step SA6, the controller 10 performs a compression process and any other necessary image process, and generates an image file having a predetermined file format.

Next, the controller 10 stores the image file having been generated in step SA6 into the storage section 11 (step SA7). Processing for storing the image file into the storage section 11 will be described later in detail.

Next, the controller 10 performs buffer clearing of the image buffer BF (step SA8), and allows the process procedure to move to step SA13.

On the contrary, the result of the determination in step SA4 is that the total line number has reached the line upper limit number (step SA4: YES), the controller 10 generates an image file on the basis of all sets of line image data that are developed in the image buffer BF (step SA9).

Next, the controller 10 stores the image file having been generated in step SA9 into the storage section 11 (step SA10). Processing for storing the image file into the storage section 11 will be described in detail later.

Next, the controller 10 performs buffer clearing of the image buffer BF (step SA11).

Next, the controller 10 determines whether or not the set of line image data having been acquired in step SA2 is the last-line image data set (step SA12).

In the case where the set of line image data is not the last-line image data set (step SA12: NO), the controller 10 allows the process procedure to move to step SA2.

In the case where the set of line image data is the last-line image data set (step SA12: YES), the controller 10 allows the process procedure to move to step SA13.

In step SA13, the controller 10 performs a thumbnail image file generation process.

When describing the process in step SA13 in detail, for each of one or more image files having been generated through the processes in steps SA1 to SA12, the controller 10 generates a thumbnail image (hereinafter referred to as "an individual thumbnail image") of an image having been recorded in the each of one or more image files.

Next, the controller 10 generates a thumbnail image in which each of the generated individual thumbnail images is combined (the thumbnail image being referred to as "a combined thumbnail image" hereinafter), and generates a set of thumbnail image data in which the generated combined thumbnail image is recorded. The set of thumbnail image data is data having a sufficiently small file size, and the file size of the set of thumbnail image data is smaller than the size upper limit.

When generating the combined thumbnail image, the controller 10 records an image of a dashed line, which represents a boundary at the boundary between every two adjacent individual thumbnail images (the image of the dashed line being referred to as "a dashed line image" hereinafter).

Figure 4:
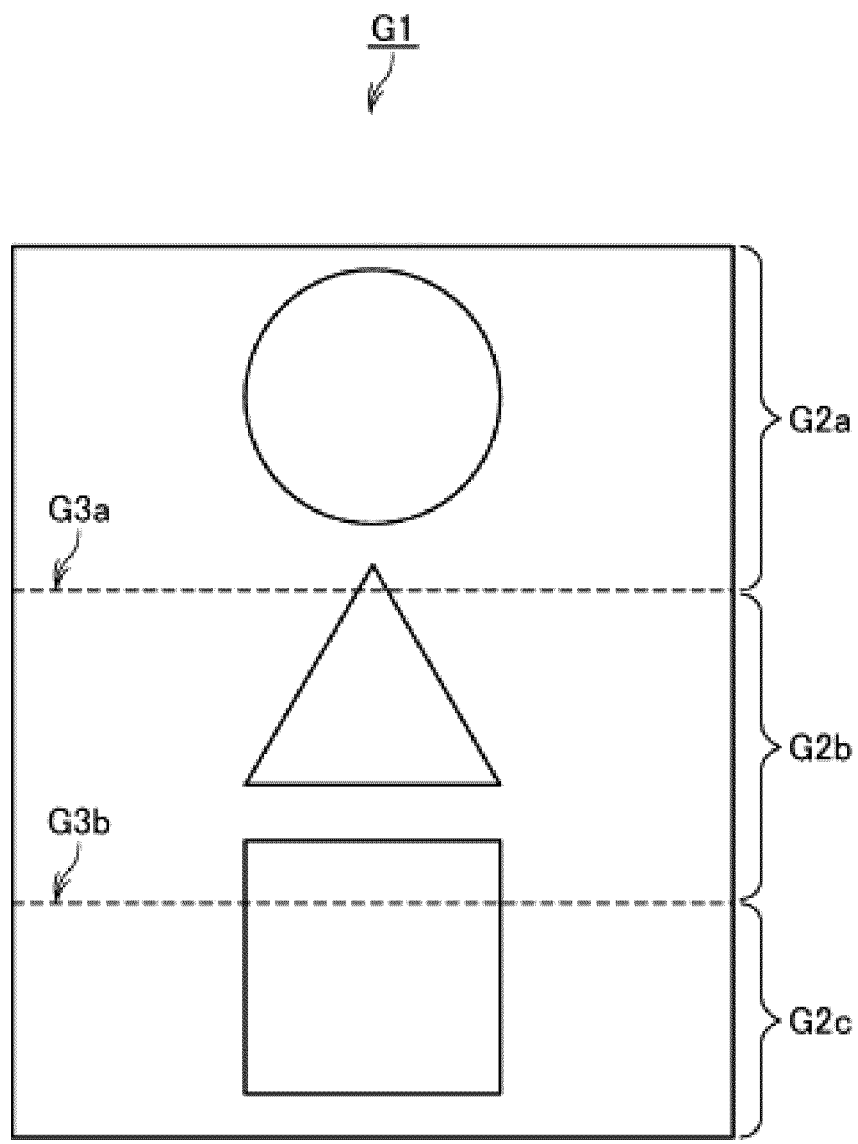
FIG. 4 is a diagram illustrating a thumbnail image.

FIG. 4 is a diagram schematically illustrating a combined thumbnail image G1, as an example of the combined thumbnail image that is generated in the thumbnail image file generation process in step SA13, in a form suitable for description.

The combined thumbnail image G1 illustrated in FIG. 4 is an image that is generated by combining three individual thumbnail images G2a, G2b, and G2c.

As illustrated in FIG. 4, at the boundary between the individual thumbnail images G2a and G2b, a dashed line image G3a representing the boundary between these images is recorded. Further, at the boundary between the individual thumbnail images G2b and G2c, a dashed line image G3b representing the boundary between these images is recorded.

The dashed line image corresponds to "the at least one image representing at least one boundary of the plurality of image files".

After having generated the set of thumbnail image data through the thumbnail image file generation process in step SA13, the controller 10 stores the generated set of thumbnail image data into the storage section 11 (step SA14). Processing for storing the set of thumbnail image data into the storage section 11 will be described in detail later.

After the execution of the process of step SA13, the controller 10 terminates the processes of the flowchart FA.

As described above, in the file generation of the present embodiment, in the case where, when one image file is generated, the file size of the generated one image file exceeds a size upper limit, the controller 10 generates a plurality of image files resulting from a division that allows the file size of each of the image files to be smaller than a size upper limit. The execution of such processing enables, for the result of the reading of the reading medium by the reading section 13, one or more image files based on the result of the reading to be stored in the storage section 11 without causing any loss.

Next, the processing performed by the controller 10 when the controller 10 stores the one or more image files into storage section 11 and the processing performed by the controller 10 when the controller 10 stores the thumbnail image file into the storage section 11 will be described. In the following description, it is assumed that, as the result of the execution of the processes of the flowchart FA in FIG. 2, the plurality of divided image files are generated.

In the present embodiment, for the processing for storing the image files into the storage section 11, there are two operation modes, one being an operation mode M1, the other one being an operation mode M2. A user is able to select any one of these operation modes in advance. Hereinafter, for each of the operation modes, processing performed by the controller 10 will be described.

Operation Mode M1

In the case where the operation mode is the operation mode M1, the controller 10 performs the following processing.

When storing the image files into the storage section 11, for a file name of each of the image files, the controller 10 gives the file name in accordance with the following rule. That is, the controller 10 handles the file name of each image file as a combination of "a piece of job identification information", "a delimiter", and "a numeric character representing a sequential order of a process in which a relevant image file has been generated".

For example, it is assumed that the piece of job identification information is "J01", the delimiter is "-" (hyphen), and the numeric character representing a sequential order of a process in which a relevant image file has been generated is an integer (decimal base) whose initial value is "1" and which is incremented in response to the increment of the sequential order of a process in which a relevant image file has been generated. Further, it is assumed that three image files have been generated. In this case, the controller 10 gives a file name "J01-1" to a firstly generated image file, gives a file name "J01-2" to a secondary generated image file, and gives a file name "J01-3" to a thirdly generated image file.

Next, the controller 10 stores the individual image files to which such file names have been given, into the storage section 11. Note that, in the operation mode M1, the individual image files may not be necessarily stored successively in a storage region of the storage section 11.

Moreover, for the generated set of thumbnail image data, the controller 10 gives it a name serving as its file name and being composed of a combination of "a piece of job identification information", "a delimiter", and "a piece of information indicating that relevant image data is the set of thumbnail image data". For example, it is assumed that the piece of job identification information is "J01", the delimiter is "-", and the piece of information indicating that relevant image data is the set of thumbnail image data is "SG". In this case, the controller 10 gives a file name "J01-SG" to the set of thumbnail image data.

Next, the controller 10 stores the set of thumbnail image data to which the file name has been given, into the storage section 11.

In the operation mode M1, the file name of each of the image files includes a piece of job identification information that is unique for each job. Thus, each of the image files having been generated by a division on the basis of the result of the reading of one reading medium can be managed by using the piece of job identification information as a keyword. Further, each of the image files includes, in its file name, a numeric character representing a sequence number of a process in which the each of the image files has been generated. Thus, based on the file name of each image file, it can be recognized at what number the each image file has been generated.

Note that, in the operation mode M1, for an image file having been lastly generated, the "numeric character indicating a sequential order of a process in which a relevant image file has been generated" may be replaced by a piece of information (for example, "99") indicating that a relevant image file is an image file having been lastly generated. With this configuration, based on the file name of each image file, an image file having been lastly generated can be correctly recognized.

Operation Mode M2

In the case where the operation mode is the operation mode M2, the controller 10 performs the following processing.

The controller 10 successively stores each of the image files into a storage region of the storage section 11 in accordance with a sequential order of a process in which the each of the image files has been generated.

Next, the controller 10 stores the set of thumbnail image data into a storage region that is continuous with the storage region in which the image files have been stored.

Next, the controller 10 acquires, for each of the image files, a start address and an end address of a storage region in which the each of the image files has been stored. Moreover, the controller 10 acquires a start address and an end address of the storage region in which the set of thumbnail image data has been stored.

Next, the controller 10 stores, for each of the image files, the start address and the end address in a state in which the start address and the end address are associated with the piece of job identification information. Moreover, the controller 10 stores, for the set of thumbnail image data, the start address and the end address in a state in which the start address and the end address are associated with the piece of job identification information.

According to the operation mode M2, each of the generated plurality of image files and the generated set of thumbnail image data can be managed in a state of being associated with the piece of job identification information.

Next, another processing by the medium processing apparatus 1 will be described.

The medium processing apparatus 1 has the function of, based on a plurality of image files having been generated by a division in one job, combining images recorded in the plurality of image files, and print-outputting the combined images.

Hereinafter, the operation of the medium processing apparatus 1 will be described by exemplifying a case where the medium processing apparatus 1 performs print-outputting of an image in response to a request from the external apparatus 2.

Note that, as described above, the external apparatus 2 may be an apparatus that is directly connected to the medium processing apparatus 1 using a USB cable or the like; may be an apparatus connected to the medium processing apparatus 1 via a local area network; or may be an apparatus connected to the medium processing apparatus 1 via a global network including the Internet.

Figure 5:
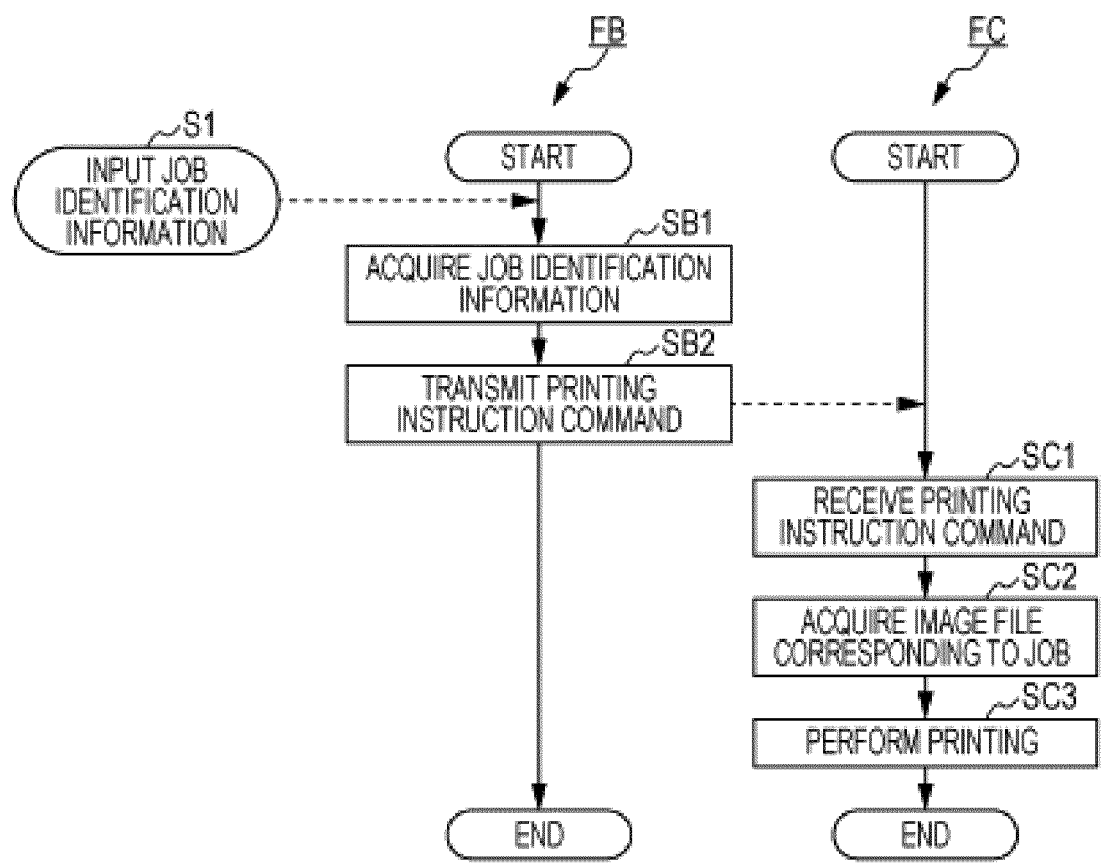
FIG. 5 is a flowchart illustrating the operation of an external apparatus and the operation of the medium processing apparatus.

FIG. 5 is a flowchart illustrating the operation of the external apparatus 2 and the operation of the medium processing apparatus 1. In FIG. 5, a flowchart FB illustrates the operation of the external apparatus 2, and a flowchart FC illustrates the operation of the medium processing apparatus 1.

The external apparatus 2 performs processes of the flowchart FB by exerting the functions of an installed program. That is, the program allows the external apparatus 2 to perform the processes of the flowchart FB. The medium processing apparatus 1 performs processes of the flowchart FC by exerting the functions of an installed program. That is, the program allows the medium processing apparatus 1 to perform the processes of the flowchart FC.

The external apparatus 2 has the function of providing a user with a user interface for use in inputting a piece of job identification information. The user inputs, into the relevant user interface, a piece of job identification information associated with a job corresponding to an image that the user desires to print-output (step S1). The piece of job identification information is notified to the user in a certain manner.

As illustrated in the flowchart FB in FIG. 5, in response to the input of the piece of job identification information by the user, the external apparatus 2 acquires the piece of job identification information (step SB1).

Next, the external apparatus 2 generates a printing instruction command, and transmits the printing instruction command to the medium processing apparatus 1 (step SB2).

The printing instruction command includes the piece of job identification information having been acquired in step SB1. The printing instruction command is a control command for instructing the print-output of an image based on image files having been generated in a job corresponding to the piece of job identification information included in the relevant command.

As illustrated in the flowchart FC in FIG. 5, the controller 10 of the medium processing apparatus 1 controls the communication section 14 and thereby receives the printing instruction command (step SC1).

Next, the controller 10 retrieves and acquires each of the image files corresponding to the piece of job identification information included in the printing instruction command having been received in step SC1 (step SC2).

In the case where an operation mode when the image files are stored is the operation mode M1, the controller 10 performs the following process in step SC2. That is, the controller 10 retrieves and acquires image files each having a file name including a piece of job identification information while using the piece of job identification as a keyword. As described above, since a piece of job identification information is included in the file name of each of image files having been stored in the operation mode M1, according to the above-described processing, all of the image files corresponding to the piece of job identification information can be correctively retrieved.

In the case where an operation mode when image files are stored is the operation mode M2, the controller 10 performs the following process in step SC2. The is, the controller 10 acquires, for each of the image files, a corresponding one of combinations of a start address and an end address that have been stored in a state of being associated with a piece of job identification information having the same value as that of the piece of job identification information included in the printing instruction command having been received in step SC1. Next, the controller 10 acquires the each of the image files, which is stored in a storage region determined by the corresponding one of the combinations of the start address and the end address. As described above, since each of the image files having been stored in the operation mode M2 is stored in a state in which a start address and an end address of a storage region in which the each of the image files has been stored are associated with the piece of job identification information, through the above-described processing, all of the image files corresponding to the job associated with the piece of job identification information can be correctively retrieved.

Next, the controller 10 performs printing of an image on the basis of each of the image files having been acquired in step SC2 (in step SC3). In step SC3, the controller 10 controls the printing section 15 and thereby successively perform printing of an image of each of the image files in accordance with a sequential order of a process in which the each of the image files has been generated. As the result of this processing, images recorded in the respective plurality of image files are combined and print-output. The images having been printed in step SC3 have sameness with images having been retrieved in a corresponding job.

Additionally, in the case where an operation mode when the image files are stored is the operation mode M1, "the numeric character representing a sequential order of a process in which a relevant image file has been generated" is include in each of the stored image files. In step SC3, the controller 10 recognizes the sequential order of a process in which each of the image files has been generated, on the basis of "the numeric character representing a sequential order of a process in which a relevant image file has been generated" included in the each of the images.

Further, in the case where an operation mode when the image files are stored is the operation mode M2, each of the image files is successively stored in a storage region of the storage section 11 in accordance with a sequential order of a process in which the each of the image files has been generated. In step SC3, the controller 10 recognize a sequential order of a process in which each of the image files has been generated, on the basis of the sequential order of a process in which the each of the image files has been stored in the storage region.

Next, another processing by the medium processing apparatus 1 will be described.

The medium processing apparatus 1 has the function of, based on a plurality of image files having been generated by a division in one job, combining images having been recorded in the plurality of images, and display-outputting the combined images.

Hereinafter, the operation of the medium processing apparatus 1 will be described by exemplifying a case where the medium processing apparatus 1 display-outputs images to the external apparatus 2 in response to a request from the external apparatus 2.

Although, in the following example, the operation of the medium processing apparatus 1 will be described by exemplifying a case where the medium processing apparatus 1 display-outputs images to the external apparatus 2, the medium processing apparatus 1 may be configured to include a display means and display the images on the display means.

Figure 6:
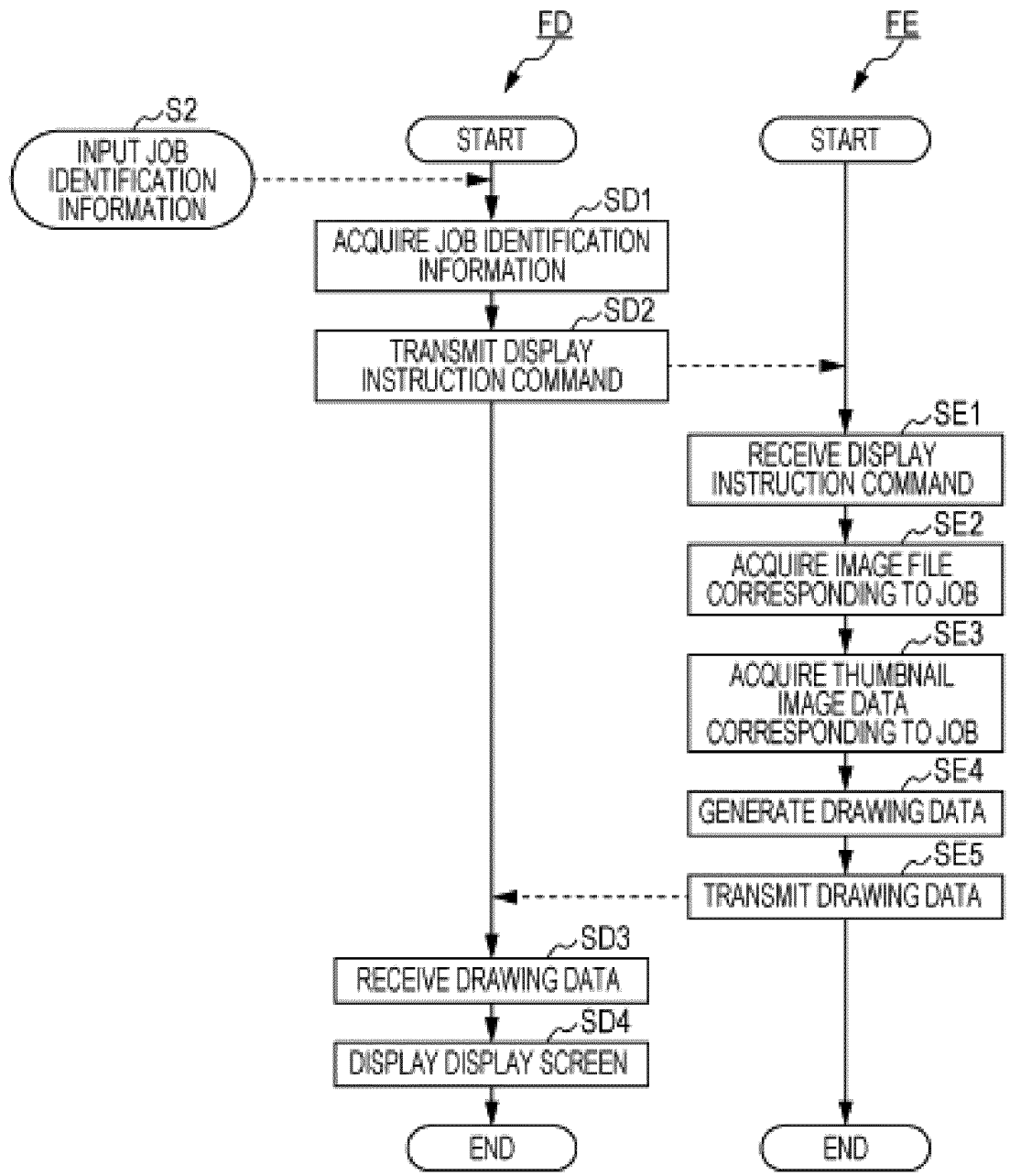
FIG. 6 is another flowchart illustrating the operation of an external apparatus and the operation of the medium processing apparatus.

FIG. 6 is a flowchart illustrating the operation of the external apparatus 2 and the operation of the medium processing apparatus 1. In FIG. 6, a flowchart FD illustrates the operation of the external apparatus 2, and a flowchart FE illustrates the operation of the medium processing apparatus 1.

The external apparatus 2 performs processes of the flowchart FD by exerting the functions of an installed program. That is, the program allows the external apparatus 2 to perform the processes of the flowchart FD. The medium processing apparatus 1 performs processes of the flowchart FE by exerting the functions of an installed program. That is, the program allows the medium processing apparatus 1 to perform the processes of the flowchart FE.

The external apparatus 2 has the function of providing a user with a user interface for use in inputting a piece of job identification information. The user inputs, into the user interface, a piece of job identification information associated with a job corresponding to an image that the user desires to display-output (step S2). The piece of job identification information is notified to the user in a certain manner.

As illustrated in the flowchart FD in FIG. 6, the external apparatus 2 acquires the piece of job identification information in response to the input of the piece of job identification information by the user (step SD1).

Next, the external apparatus 2 generates a display instruction command, and transmits the display instruction command to the medium processing apparatus 1 (step SD2).

The display instruction command includes the piece of job identification information having been acquired in step SD1. The display instruction command is a control command for instructing the display-output of images based on image files and a set of thumbnail image data that have been generated in a job corresponding to the piece of job identification information included in the relevant command.

As illustrated in the flowchart FE in FIG. 6, the controller 10 of the medium processing apparatus 1 controls the communication section 14 and thereby receives the display instruction command (step SE1).

Next, the controller 10 retrieves and acquires each of the image files corresponding to the piece of job identification information included in the display instruction command having been received in step SE1 (step SE2). The controller 10 acquires the image files in the manner described above.

Next, the controller 10 retrieves and acquires a set of thumbnail image data corresponding to a job associated with the piece of job identification information included in the display instruction command having been received in step SE1 (step SE3).

In the case where an operation mode when the image files are stored is the operation mode M1, the controller 10 performs the following processing in step SE3. That is, the controller 10 retrieves and acquires a set of thumbnail image data having a file name including the piece of job identification information, using the piece of job identification information as a keyword. As described above, since the piece of job identification information is included in the file name of the set of thumbnail image data having been stored in the operation mode M1, through the above-described processing, the set of thumbnail image data corresponding to the job associated with the piece of job identification information can be correctly retrieved.

In the case where an operation mode when the set of thumbnail image data is stored is the operation mode M2, the controller 10 performs the following processing in step SE3. That is, the controller 10 acquires a combination of a start address and an end address that indicate a storage region of the set of thumbnail image data, and that have been stored in a state of being associated with a piece of job identification information having the same value as that of the piece of job identification information included in the display instruction command having been received in step SE1. Next, the controller 10 acquires the set of thumbnail image data having been stored in the storage region determined by the combination of the start address and the end address. As described above, since the set of thumbnail image data having been stored in the operation mode M2 is stored in a state in which a start address and an end address of a storage region in which the set of thumbnail image data has been stored are associated with the piece of job identification information, through the above-described processing, the set of thumbnail image data corresponding to the job associated with the piece of job identification information can be correctly retrieved.

Next, the controller 10 generates a set of drawing data for use in displaying a display screen Q1 (FIG. 7), on the basis of each of the image files having been acquired in step SE2 and the set of thumbnail image data having been acquired in step SE3 (step SE4). The set of drawing data includes information to be displayed on the display screen Q1. The set of drawing data is data having a predetermined format and complying with a communication protocol for use in communication that is made between the external apparatus 2 and the medium processing apparatus 1.

Next, the controller 10 controls the communication section 14 and thereby transmits the set of drawing data having been generated in step SE4 to the external apparatus 2 (step SE5).

As illustrated in the flowchart FD in FIG. 6, the external apparatus 2 received the set of drawing data (step SD3).

Next, the external apparatus 2 allows the display screen Q1 to be displayed on the display panel 2a on the basis of the set of drawing data having been received in step SD3 (step SD4).

Figure 7:
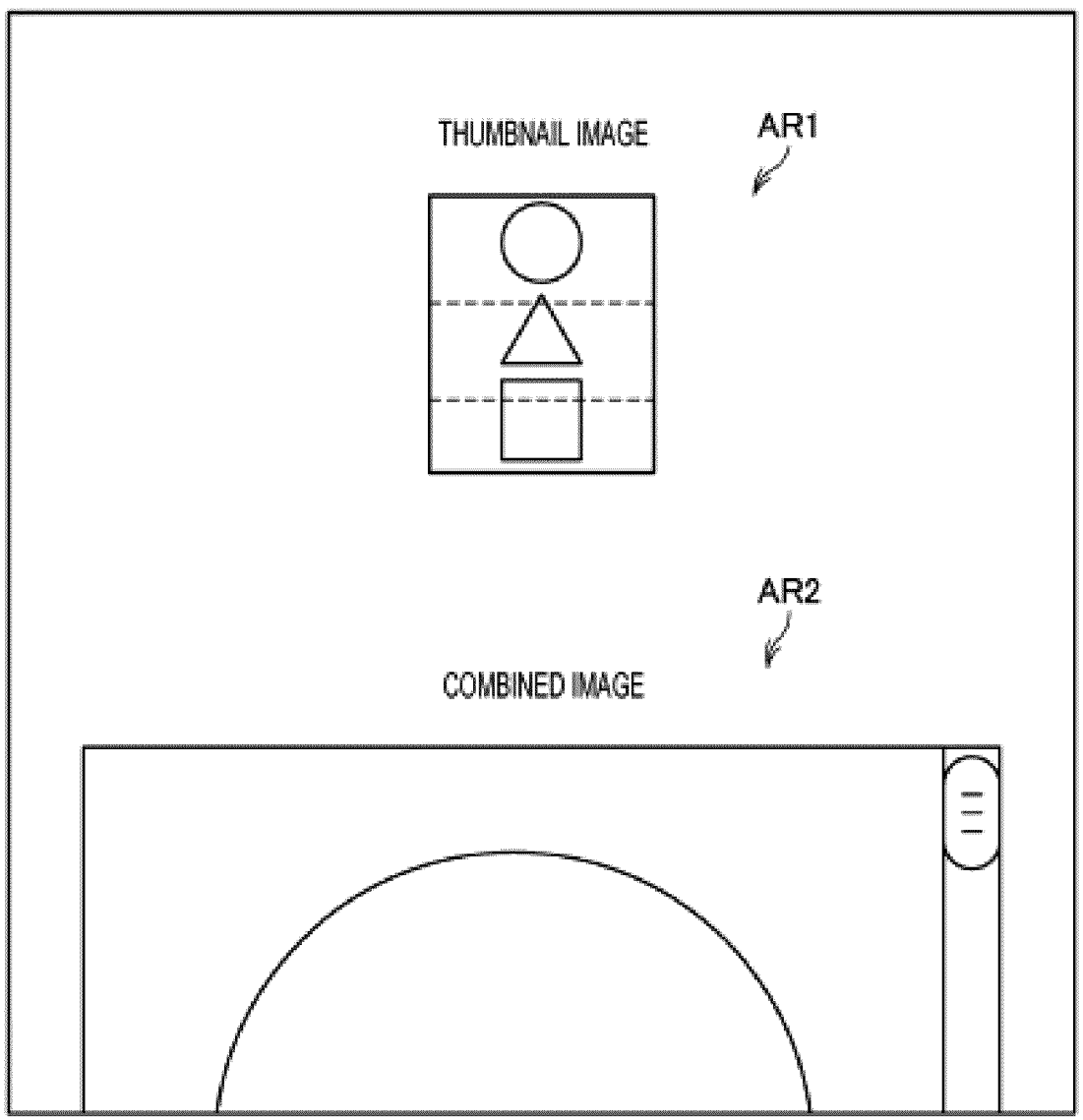
FIG. 7 is a diagram illustrating a display screen.

FIG. 7 is a diagram illustrating the display screen Q1.

As illustrated in FIG. 7, the display screen Q1 has a thumbnail image display region AR1. In the thumbnail image display region AR1, a combined thumbnail image based on the set of thumbnail image data having been acquired by the controller 10 in step SE3 is displayed. A user is able to correctly recognize the whole of the images having been read in a corresponding job by viewing the combined thumbnail image having been displayed in the thumbnail image display region AR1. Further, as described above, on the combined thumbnail images, a dashed line image representing a region is recorded at the boundary between every two adjacent individual thumbnail images. Thus, the user is able to correctly recognize an image having been recorded in each of the divided image files. In addition, the dashed line is commonly used for indicating a boundary, and thus is suitable for indicating the boundary.

As illustrated in FIG. 7, the display screen Q1 includes a combined image display region AR2. In the combined image display region AR2, images resulting from combining images recorded in the respective image files having been acquired by the controller 10 in step SE2 are displayed. The images having been displayed in the combined image display region AR2 has sameness with images having been read in a corresponding job. In addition, when the images are displayed in the combined image display region AR2, a process of adjusting the resolution degree and any other process are appropriately performed by means of existing technologies.

A user is able to correctly recognize the details of images on a medium having been read in a corresponding job by viewing the images having been displayed in the combined image display region AR2.

As described above, the medium processing apparatus 1 (the reading apparatus) includes the storage section 11 configured to store data in itself, the transport section 12 configured to transport the reading medium (the medium), the reading section 13 configured to optically read the reading medium transported by the transport section 12, and the controller 10 configured to, in response to the reading of the reading medium by the reading section 13, acquire a set of line image data (the set of read data) based on the result of the reading, generate an image file based on the acquired set of line image data, and allow the storage section 11 to store in itself the generated image file. The controller 10 includes the function of, when generating the image file, generating a plurality of image files resulting from a division that allows the file size of each of the plurality of image file to be smaller than a size upper limit, and of allowing the storage section 11 to store in itself the generated plurality of image files in a state in which the plurality of image files are associated with one another.

According to this configuration, for the result of the reading of the reading medium by the reading section 13, the medium processing apparatus 1 is capable of, without causing any loss, storing an image file which is based on the result of the reading and whose file size is smaller than a size upper limit into the storage section 11. That is, the medium processing apparatus 1 is capable of achieving processing for successively dealing with an upper limit that is set for the file size of a generated image file.

Further, in the present embodiment, the controller 10 includes the function of, based on the plurality of image files that are associated with one another, combining images recorded in the respective plurality of image files, and outputting the combined images.

According to this configuration, in the case where the plurality of image files have been generated, the medium processing apparatus 1 is capable of outputting an image having sameness with an image having been read by the reading section 13, on the basis of the plurality of image files.

Further, in the present embodiment, the controller 10 includes the function of, based on the plurality of image files that are associated with one another, combining images recorded in the respective plurality of image files, and print-outputting the combined images.

According to this configuration, in the case where the plurality of image files have been generated, the medium processing apparatus 1 is capable of print-outputting an image having sameness with an image having been read by the reading section 13, on the basis of the plurality of image files.

Further, in the present embodiment, the controller 10 includes the function of, based on the plurality of image files that are associated with one another, combining images recorded in the respective plurality of image files, and display-outputting the combined images.

According to this configuration, in the case where the plurality of image files have been generated, the medium processing apparatus 1 is capable of display-outputting an image having sameness with an image having been read by the reading section 13, on the basis of the plurality of image files.

Further, in the present embodiment, based on the reading of the reading medium by the reading section 13, the controller 10 generates a set of thumbnail image data in which a thumbnail image corresponding to an image recorded on the reading medium is recorded, and allows the storage section 11 to store in itself the set of thumbnail image data in a state in which the set of thumbnail image data is associated with the generated image file.

According to this configuration, the controller 10 is capable of performing processing utilizing the set of thumbnail image data, on the basis of the set of thumbnail image data, which the controller 10 has allowed the storage section 11 to store in itself.

Further, in the present embodiment, in the case where the divided plurality of image files are generated, at least one image representing at least one boundary of the plurality of image files is recorded on the thumbnail image recorded in the set of thumbnail image data.

According to this configuration, when display-outputting a combined thumbnail image on the basis of the set of thumbnail image data, the medium processing apparatus 1 is capable of clearly indicating the boundary between every two adjacent image files.

Further, in the present embodiment, the at least one image representing the at least one boundary of the plurality of image files is a dashed line.

According to this configuration, the use of the dashed line that is widely used for indicating a boundary enables the at least one boundary of the plurality of image files to be clearly indicated in an appropriate manner.

Further, in the present embodiment, in the case of the operation mode M1, the controller 10 allows the plurality of image files to be associated with one another by allowing the file names of the respective plurality of image files to have associations with one another.

According to this configuration, the controller 10 is capable of, based on the associations among the file names, managing the plurality of image files, which have been generated by a division on the basis of the result of the reading by the reading section 13, in a state in which the plurality of image files are associated with one another.

Further, in the present embodiment, the controller 10 allows the file names of the respective plurality of image files to have associations with one another by allowing each of the file names of the respective plurality of image files to include information common to the plurality of image files.

According to this configuration, the controller 10 is capable of correctly allowing the file names to have associations with one another.

Further, in the present embodiment, the controller 10 allows the plurality of image files to be associated with one another by successively storing the plurality of image files into a storage region of the storage section 11.

According to this configuration, the controller 10 is capable of, through the utilization of the successive storage of the plurality of image files into the storage region of the storage section 11, managing the plurality of image files, which have been generated by a division on the basis of the result of the reading by the reading section 13, in a state in which the plurality of image files are associated with one another.

Further, in the present embodiment, based on the result of the reading by the medium processing apparatus 1, which optically reads the reading medium (the medium), the external apparatus 2 (the control apparatus) acquires a set of drawing data based on a plurality of image files generated by a division that allows the file size of each of the plurality of image files to be smaller than a size upper limit; combines images recorded in the respective plurality of images on the basis of the acquired set of drawing data; and displays the combined images on the display section 2a.

According to this configuration, in the case where the plurality of image files have been generated by the medium processing apparatus 1, the external apparatus 2 is capable of displaying an image having sameness with an image having been read by the medium processing apparatus 1.

Further, in the present embodiment, the set of drawing data includes information in relation to a thumbnail image of an image having been read in the medium processing apparatus 1, and the external apparatus 2 displays the thumbnail image on the display section 2a on the basis of the set of drawing data.

According to this configuration, a user is able to refer to the thumbnail image of an image based on the result of the reading by the medium processing apparatus 1.

Further, in the present embodiment, when displaying the thumbnail image on the basis of the set of drawing data, the external apparatus 2 displays at least one image representing at least one boundary of the plurality of image files.

According to this configuration, in the case where the thumbnail image is displayed, the external apparatus 2 is capable of clearly indicating the boundary between every two adjacent image files.

Note that the above-described embodiment is absolutely indicative of one illustrative embodiment of the invention, and can be appropriately modified and applied within the scope of the invention.

For example, in the above-described embodiment, the invention has been described by exemplifying the line-type medium processing apparatus 1 (the reading apparatus) configured to perform optical reading while allowing the reading medium to move relatively to a reading mechanism being in a fixed state and including the CIS module. The invention, however, can be also applied to a serial-type medium processing apparatus 1 configured to perform optical reading while allowing the reading mechanism to scan relative to the reading medium being in a fixed state. Namely, the invention can be widely applied to reading apparatuses configured to perform optical reading and generate an image file on the basis of the result of the reading.

Further, for example, in the above-described embodiment, the printing method of the medium processing apparatus 1 is the ink jet method, but any other printing method is applicable to the medium processing apparatus 1.

Further, the functional block having been described using the figure is a schematic diagram illustrating the result of categorizing the functional configuration of each apparatus on the basis of the content of main processes of the each apparatus in order to make it easy to understand the invention. The configuration of the each apparatus can be categorized into a larger number of constituent elements on the basis of the content of processes of the each apparatus. Further, the configuration of the each apparatus can be also categorized in such a way that one constituent element executes a larger number of processes. Further, the process of each constituent element may be executed by one hardware component or a plurality of hardware components. Further, the process of each constituent element may be achieved by one program, or may be achieved by a plurality of programs.

Further, the process units of each of the flowcharts illustrated using the figures are process units resulting from dividing processing of the each apparatus on the basis of the content of main processes of the each apparatus in order to make it easy to understand the processing of the each apparatus. The invention is not limited to any method of dividing the process units as well as any names of the process units. The processing of the each apparatus can be also divided into a larger number of process units on the basis of the content of the processing of the each apparatus. Further, the processing of the each apparatus can be also divided in such a way that one process unit includes a larger number of processes. Further, processing order in each of the above flowcharts is not limited to that of the illustrated example, and may be changed, provided that processing similar to that of the illustrated example can be performed.

What is claimed is:

1. A reading apparatus comprising:
a storage configured to store data in the storage;
a reader configured to optically read a medium; and
a processor configured to, in response to the reading of the medium by the reader,
acquire a set of read data based on a result of the reading,
generate an image file based on the acquired set of read data, and
cause the storage to store the generated image file,
generate, when generating the image file, a plurality of image files resulting from a division that causes a file size of each of the plurality of image files to be smaller than a size upper limit, and cause the storage to store the generated plurality of image files in a state in which the plurality of image files are associated with one another,
set a line upper limit number representing a number of line image data that can be acquired into an image buffer as the result of the reading such that the file size of an image file acquired from the number of line image data is not beyond the size upper limit,
store, when the number of line image data acquired into the image buffer reaches the line upper limit number, the image file acquired from the number of line image data in the storage,
based on the reading of the medium by the reader, generate a set of thumbnail image data in which a thumbnail image corresponding to an image recorded on the medium is recorded,
cause the storage to store the generated set of thumbnail image data in a state in which the set of thumbnail image data is associated with the generated image file, and
generate a combined thumbnail image of the set of thumbnail image data, the combined thumbnail image including at least one image representing at least one boundary of the plurality of image files.

2. The reading apparatus according to claim 1, wherein the processor is further configured to combine, based on the plurality of image files that are associated with one another, images recorded in the respective plurality of image files, and output the combined images.

3. The reading apparatus according to claim 2, wherein the processor is further configured to combine, based on the plurality of image files that are associated with one another, images recorded in the respective plurality of image files, and print-output the combined images.

4. The reading apparatus according to claim 2, wherein the processor is further configured to combine, based on the plurality of image files that are associated with one another, images recorded in the respective plurality of image files, and display-output the combined images.

5. The reading apparatus according to claim 1, the at least one image representing the at least one boundary of the plurality of image files is a dashed line.

6. The reading apparatus according to claim 1, wherein the processor is further configured to cause the plurality of image files to be associated with one another by causing file names of the respective plurality of image files to have associations with one another.

7. The reading apparatus according to claim 6, wherein the processor is further configured to cause the file names of the respective plurality of image files to have associations with one another by causing each of the file names of the respective plurality of image files to include information common to the plurality of image files.

8. The reading apparatus according to claim 1, wherein the processor is further configured to cause the plurality of image files to be associated with one another by successively storing the plurality of image files into a storage region of the storage.

9. A control method for a reading apparatus including a storage configured to store data in the storage, and a reader configured to optically read a medium, the control method comprising:
in response to the reading of the medium by the reader, acquiring a set of read data based on a result of the reading;
based on the acquired set of read data, generating a plurality of image files in such a way as to cause a file size of each of the plurality of image files to be smaller than a size upper limit;
causing the storage to store the generated plurality of image files in a state in which the plurality of image files are associated with one another;
setting a line upper limit number representing a number of line image data that can be acquired into an image buffer as the result of the reading such that the file size of an image file acquired from the number of line image data is not beyond the size upper limit;
storing, when the number of line image data acquired into the image buffer reaches the line upper limit number, the image file acquired from the number of line image data in the storage;
based on the reading of the medium by the reading apparatus, generating a set of thumbnail image data in which a thumbnail image corresponding to an image recorded on the medium is recorded;
causing the storage to store the generated set of thumbnail image data in a state in which the set of thumbnail image data is associated with the generated image file; and
generating a combined thumbnail image of the set of thumbnail image data, the combined thumbnail image including at least one image representing at least one boundary of the plurality of image files.

10. A control apparatus comprising:
a display; and
a processor configured to:
acquire, based on a result of reading by a reading apparatus that optically reads a medium, a set of drawing data based on a plurality of image files generated by a division that causes a file size of each of the plurality of image files to be smaller than a size upper limit;
combine images recorded in the respective plurality of image files based on the acquired set of drawing data;
display the combined images on the display;
set a line upper limit number representing a number of line image data that can be acquired into an image buffer as the result of the reading such that the file size of an image file acquired from the number of line image data is not beyond the size upper limit;
store, when the number of line image data acquired into the image buffer reaches the line upper limit number, the image file acquired from the number of line image data in a storage;
based on the reading of the medium by the reading apparatus, generate a set of thumbnail image data in which a thumbnail image corresponding to an image recorded on the medium is recorded;

cause the storage to store the generated set of thumbnail image data in a state in which the set of thumbnail image data is associated with the generated image file; and generate a combined thumbnail image of the set of thumbnail image data, the combined thumbnail image including at least one image representing at least one boundary of the plurality of image files.

11. The control apparatus according to claim 10, wherein the set of drawing data includes information in relation to the thumbnail image corresponding to an image recorded on the medium, and the thumbnail image is displayed on the display based on the set of drawing data.

12. The control apparatus according to claim 11, wherein, when the thumbnail image is displayed based on the set of drawing data, the at least one image representing the at least one boundary of the plurality of image files is displayed.

13. The control apparatus according to claim 10, wherein the at least one image representing the at least one boundary of the plurality of image files is a dashed line.

14. A non-transitory tangible computer-readable medium for storing a program which, when executed by a processor of a reading apparatus including a reader, causes the processor to execute processing comprising:

in response to reading of a medium by the reader, acquiring a set of read data based on a result of the reading;

based on the acquired set of read data, generating a plurality of image files resulting from a division that causes a file size of each of the plurality of image files to be smaller than a size upper limit;

setting a line upper limit number representing a number of line image data that can be acquired into an image buffer as the result of the reading such that the file size of an image file acquired from the number of line image data is not beyond the size upper limit;

storing, when the number of line image data acquired into the image buffer reaches the line upper limit number, the image file acquired from the number of line image data in a storage;

based on the reading of the medium by the reader, generating a set of thumbnail image data in which a thumbnail image corresponding to an image recorded on the medium is recorded;

causing the storage to store the generated set of thumbnail image data in a state in which the set of thumbnail image data is associated with the generated image file; and generating a combined thumbnail image of the set of thumbnail image data, the combined thumbnail image including at least one image representing at least one boundary of the plurality of image files.

15. A non-transitory tangible computer-readable medium for storing a program which, when executed by a processor of a control apparatus including a display causes the processor to execute processing comprising;

based on a result of reading by a reading apparatus that optically reads a medium, acquiring a set of drawing data based on a plurality of image files generated by a division that causes a file size of each of the plurality of image files to be smaller than a size upper limit;

based on the acquired set of drawing data, combining images recorded in the respective plurality of image files and displaying the combined images on the display;

setting a line upper limit number representing a number of line image data that can be acquired into an image buffer as the result of the reading such that the file size of an image file acquired from the number of line image data is not beyond the size upper limit;

storing, when the number of line image data acquired into the image buffer reaches the line upper limit number, the image file acquired from the number of line image data in a storage;

based on the reading of the medium by the reading apparatus, generating a set of thumbnail image data in which a thumbnail image corresponding to an image recorded on the medium is recorded;

causing the storage to store the generated set of thumbnail image data in a state in which the set of thumbnail image data is associated with the generated image file; and generating a combined thumbnail image of the set of thumbnail image data, the combined thumbnail image including at least one image representing at least one boundary of the plurality of image files.

16. The reading apparatus according to claim 1, wherein the processor generates the combined thumbnail image by combining the set of thumbnail image data.

* * * * *